United States Patent
Burd

(10) Patent No.: US 9,352,837 B2
(45) Date of Patent: May 31, 2016

(54) AIRCRAFT GALLEY WITH APPLIANCE INSERTS

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/303,903

(22) Filed: Jun. 13, 2014

(65) Prior Publication Data

US 2014/0368101 A1   Dec. 18, 2014

Related U.S. Application Data

(60) Provisional application No. 61/836,437, filed on Jun. 18, 2013.

(51) Int. Cl.
*B64D 11/04* (2006.01)

(52) U.S. Cl.
CPC . *B64D 11/04* (2013.01); *Y02T 50/46* (2013.01)

(58) Field of Classification Search
CPC ...... A47B 31/02; A47B 31/06; B61D 37/006; B64D 11/04; B64D 2011/0046
See application file for complete search history.

(56) References Cited

U.S. PATENT DOCUMENTS

| | | | |
|---|---|---|---|
| 4,456,206 A * | 6/1984 | Tijssen | 244/118.5 |
| 5,083,727 A | 1/1992 | Pompei et al. | |
| 7,565,903 B2 | 7/2009 | Sasaki et al. | |
| 7,780,114 B2 | 8/2010 | Doebertin et al. | |
| 7,954,761 B2 | 6/2011 | Johnson et al. | |
| 8,087,611 B2 | 1/2012 | Arnold et al. | |
| 8,387,916 B2 | 3/2013 | Baatz et al. | |
| 2006/0145002 A1 * | 7/2006 | Van Loon | 244/118.1 |
| 2007/0228216 A1 * | 10/2007 | Wenstrom | 244/118.5 |
| 2008/0129159 A1 * | 6/2008 | Johnson et al. | 312/111 |
| 2008/0150406 A1 | 6/2008 | Arnold et al. | |
| 2009/0321574 A1 * | 12/2009 | Erickson et al. | 244/131 |
| 2012/0085862 A1 | 4/2012 | Pangalila | |
| 2012/0217343 A1 * | 8/2012 | Koschberg et al. | 244/118.5 |
| 2012/0248245 A1 * | 10/2012 | Schliwa | 244/118.5 |
| 2012/0285335 A1 | 11/2012 | Cunningham et al. | |
| 2013/0280953 A1 | 10/2013 | Radeke et al. | |
| 2014/0263835 A1 * | 9/2014 | Godecker et al. | 244/118.5 |
| 2014/0368100 A1 * | 12/2014 | Burd | 312/236 |
| 2015/0069891 A1 * | 3/2015 | Schimanowski et al. | 312/242 |

FOREIGN PATENT DOCUMENTS

WO   2012040564 A2   3/2012

OTHER PUBLICATIONS

International Search Report, Jun. 13, 2013, 5 pages.
International Search Report, Oct. 1, 2014, 5 pages, from App. No. PCT/US2014/042585, published as WO2014/204867 Dec. 24, 2014.

\* cited by examiner

*Primary Examiner* — Daniel Rohrhoff
(74) *Attorney, Agent, or Firm* — Fulwider Patton LLP

(57) ABSTRACT

An aircraft galley with appliance inserts includes a system for locating and attaching an aircraft monument such as a galley insert or a galley appliance, a single line replaceable unit, or part of a componentized system, within an aircraft galley to provide primary structural support for functional components of the aircraft monument required for normal operation. The system includes an inner liner with upper and lower fixed, sliding or floating connectors, which can include thermal insulators.

5 Claims, 1 Drawing Sheet

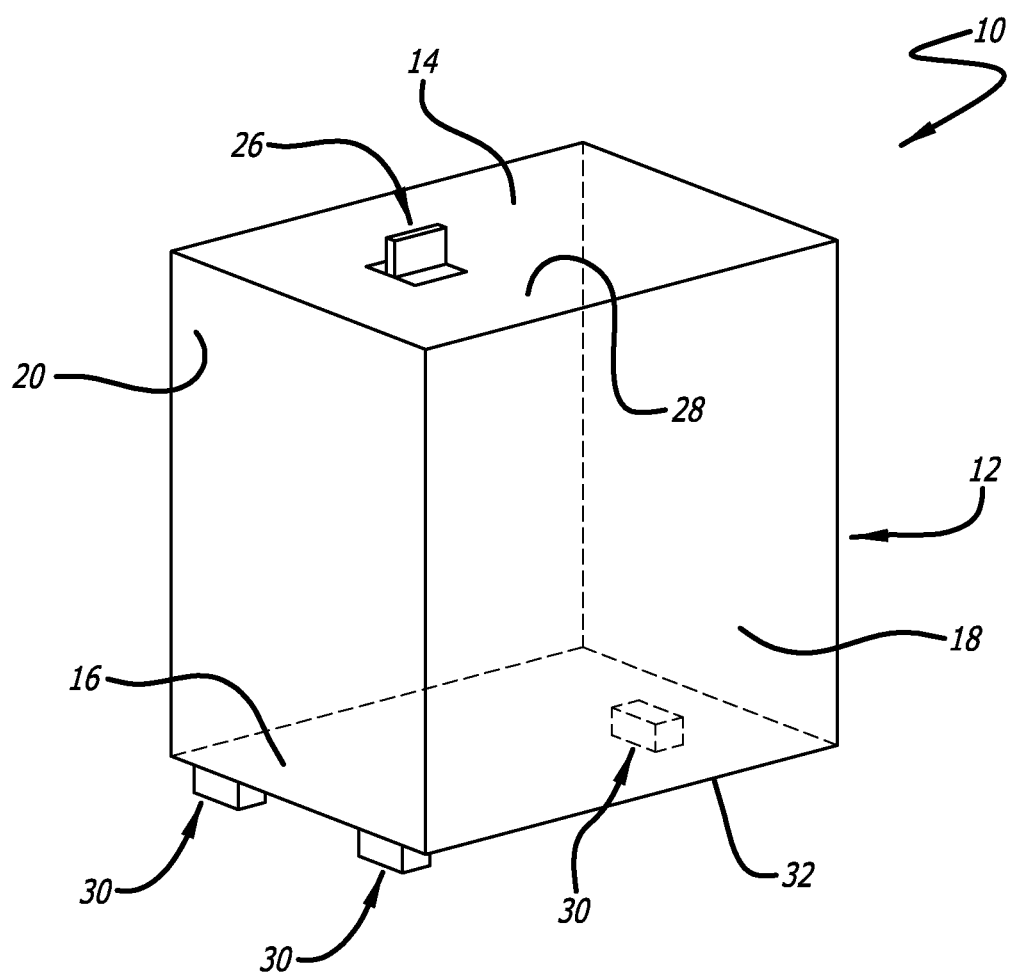

AIRCRAFT GALLEY WITH APPLIANCE INSERTS

CROSS-REFERENCES TO RELATED APPLICATIONS

This application is based upon and claims priority from U.S. Provisional Application No. 61/836,437, filed Jun. 18, 2013, incorporated by reference in its entirety.

This invention relates generally to transport aircraft galley systems, and more particularly relates to a system for locating and attaching a galley insert or galley appliance within an aircraft galley.

BACKGROUND

Aircraft galley systems for commercial aircraft with in-flight catering services typically incorporate self-contained refrigeration units that are cooled to prevent spoilage of food prior to distribution to passengers, and to keep beverages at desired serving temperatures, as well as separate ovens for heating food in the preparation of hot meals to be served aboard aircraft. Currently space must be allocated for each of the heating and cooling devices separately, either in the same galley or in different galleys.

One known modular aircraft galley utilizes several vertical and horizontal structural elements for accommodating slide-in devices or items of equipment such as galley inserts or galley appliances. The galley includes structural elements that form an essentially unchangeable basic element providing connection elements for the mechanical connection and interfacing of the slide-in devices or items of equipment, so that various kinds of the slide-in devices or items of equipment can be interchanged at various locations. Such modular aircraft galley systems typically use the outer case of a galley insert or galley appliance, such as an oven, refrigerator or other such device, as the principal mechanism for locating the galley insert or galley appliance in an inner cavity or liner of a galley.

It would be desirable to provide an inner liner for an aircraft galley or other aircraft monument that provides primary structural support for functional components of a galley insert or galley appliance, such as wiring, tubing, insulation, and the like, that are required for normal operational capacities of the galley insert or galley appliance, allowing the functional components to be directly attached to the structural liner or independently located from the structural liner. It would also be desirable for such an inner liner to include upper and lower fixed, sliding or floating attachment points, either individually or in combination. It would also be desirable to optionally incorporate thermal disconnects to the galley structure in such attachment points. It would also be desirable for such an inner liner to allow use of a single replaceable galley insert or galley appliance to form a single line replaceable unit or form part of a componentized system, and to reduce weight of aircraft galley systems by the elimination of conventional galley insert or galley appliance supporting frames or cases. It would be desirable to eliminate usage of single line replaceable unit as a galley insert or galley appliance in favor of modular, component line replaceable units as a galley insert or galley appliance and componentization of the conventional galley insert or galley appliance design. The present invention meets these and other needs.

SUMMARY OF THE INVENTION

Briefly, and in general terms, the present invention provides for a system for locating and attaching an aircraft monument within an aircraft galley that provides primary structural support for functional components of an aircraft monument that are required for normal operational capacities of the aircraft monument, allowing the functional components to be directly attached or independently located. The system provides for an inner liner that can include upper and lower fixed, sliding or floating connectors, either individually or in combination, and that can optionally incorporate thermal insulators. The system allows for use of a single replaceable galley insert or galley appliance to form a single line replaceable unit or form part of a componentized system, and allows for reduction in weight of aircraft galley systems by the elimination of conventional galley insert or galley appliance supporting frames or cases, and usage of single line replaceable units as a galley insert or galley appliance, and componentization of the conventional galley insert or galley appliance design.

Accordingly, the present invention provides for a system for locating and attaching an aircraft monument within an aircraft galley system for locating and attaching a galley insert or galley appliance within an aircraft galley. The system includes a structural inner liner configured to locate and interface of an aircraft monument within an aircraft galley, the structural inner liner having a housing, and one or more connectors for attaching and locating the housing within the aircraft galley. In a presently preferred aspect, the aircraft monument can be a galley insert or a galley appliance, a single line replaceable unit, or part of a componentized system, for example.

In another presently preferred aspect, the housing is generally rectangular box-shaped, and includes a top wall, a bottom wall, a left side wall, and a right side wall. In another presently preferred aspect, the one or more connectors for locating and attaching the housing within the aircraft galley may be a fixed connector, a sliding connector, a floating connector, or a thermal insulator, for example. In another presently preferred aspect, the one or more connectors for locating and attaching the housing within the aircraft galley may include a sharks fin floating stabilizer mounted on an upper exterior surface of the top wall. In another presently preferred aspect, the one or more connectors for locating and attaching the housing within the aircraft galley may include a plurality of ceramic insulators are mounted a corresponding plurality of locations on an lower exterior surface of the bottom wall. In another presently preferred aspect, the structural inner liner is configured to support components required for normal operation of the aircraft monument, such as wiring, tubing, insulation, or the like.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

The FIGURE is a perspective view of the system for locating and attaching a galley insert or galley appliance within an aircraft galley according to the present invention.

DETAILED DESCRIPTION OF THE PREFERRED EMBODIMENTS

Referring to the drawing, which is provided for purposes of illustration and by way of example, the present invention provides for a system for locating and attaching a galley insert or galley appliance within an aircraft galley.

As is illustrated in the FIGURE, the system for locating and attaching a galley insert or galley appliance within an aircraft galley includes a structural inner liner 10 having a generally rectangular box-shaped housing 12 for location and interfacing of a galley insert or galley appliance (not shown) such as an oven, refrigerator or the like, within an aircraft galley or other aircraft monument (not shown). The generally rectangular box-shaped housing of the structural inner liner includes a top wall 14, a bottom wall 16, a left side wall 18, and a right side wall 20.

A sharks fin floating stabilizer or connector 26 preferably is mounted on an upper exterior surface 28 of the top wall, and a plurality of ceramic insulators 30 are preferably mounted at typically three or four locations on an lower exterior surface 32 of the bottom wall.

The structural inner liner according to the system of the invention for locating and attaching a galley insert or galley appliance such as an oven, refrigerator or other cooking or cooling device, similar monument or the like, supports the components, wiring, tubing, insulation, and the like required for normal operation of the galley insert or galley appliance. The lower and upper attachment points for locating and attaching the structural inner liner to the galley insert, galley appliance, or other monument, may be provided in fixed, sliding or floating form, either individually or in combination. The attachments optionally may also incorporate thermal disconnects to the galley structure if required, and the functional components of the galley insert, galley appliance, or other monument, may be directly attached to or independently located from the structural inner liner. The galley insert, galley appliance, or other monument located and attached by the structural inner liner of the invention may form a single line replaceable unit, or may form part of a componentized system. The structural inner liner according to the system of the invention allows weight savings by the elimination of the conventional supporting frame or case for a galley insert, galley appliance, or other monument. The structural inner liner according to the system of the invention also allows service cost savings through the use of component line replaceable units.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A system for locating and attaching an aircraft monument within an aircraft galley, comprising:

an aircraft monument structural inner liner for an aircraft galley, said structural inner liner having a housing including a top wall, a bottom wall, a left side wall, and a right side wall; and at least one top fin connector mounted to an upper exterior surface of said top wall of said housing for attaching and locating the housing to the aircraft galley; and at least three bottom thermal insulating connectors mounted to a lower exterior surface of said bottom wall for forming an insulated connection to the aircraft galley.

2. The system of claim 1, wherein said aircraft monument comprises a galley insert.

3. The system of claim 1, wherein said housing is generally rectangular box-shaped.

4. The system of claim 1, wherein said at least one top fin connector comprises a fixed top fin connector.

5. The system of claim 1, wherein said plurality at least three bottom thermal insulating connectors comprise ceramic insulators.

\* \* \* \* \*